US011833569B2

(12) United States Patent
Common et al.

(10) Patent No.: US 11,833,569 B2
(45) Date of Patent: Dec. 5, 2023

(54) FEED APPARATUS FOR TRANSFER PRESS

(71) Applicant: ADVAL TECH HOLDING AG, Niederwangen (CH)

(72) Inventors: Matthias Common, Zollikofen (CH); Urs Graf, Bösingen (CH)

(73) Assignee: ADVAL TECH HOLDING AG, Niederwangen (CH)

( * ) Notice: Subject to any disclaimer, the term of this patent is extended or adjusted under 35 U.S.C. 154(b) by 117 days.

(21) Appl. No.: 17/435,272

(22) PCT Filed: Feb. 27, 2020

(86) PCT No.: PCT/EP2020/055162
§ 371 (c)(1),
(2) Date: Aug. 31, 2021

(87) PCT Pub. No.: WO2020/178138
PCT Pub. Date: Sep. 10, 2020

(65) Prior Publication Data
US 2022/0143675 A1 May 12, 2022

(30) Foreign Application Priority Data

Mar. 1, 2019 (EP) .................................... 19160179
Dec. 11, 2019 (CH) ...................................... 1589/19
Dec. 11, 2019 (CH) ...................................... 1590/19

(51) Int. Cl.
*B21D 43/05* (2006.01)
*B21D 43/10* (2006.01)
*B65G 25/02* (2006.01)
(52) U.S. Cl.
CPC ........... *B21D 43/055* (2013.01); *B21D 43/10* (2013.01); *B65G 25/02* (2013.01)

(58) Field of Classification Search
None
See application file for complete search history.

(56) References Cited

U.S. PATENT DOCUMENTS

| 3,939,992 A | 2/1976 | Mikulec |
| 4,404,837 A | 9/1983 | Allen et al. |
| 4,735,303 A * | 4/1988 | Wallis .................. B21D 43/055 72/405.13 |

FOREIGN PATENT DOCUMENTS

| CH | 688 128 A5 | 5/1997 |
| EP | 0 490 821 A1 | 6/1992 |

(Continued)

OTHER PUBLICATIONS

International Search Report for PCT/EP2020/055162 dated, May 8, 2020 (PCT/ISA/210).

*Primary Examiner* — Kavel Singh
(74) *Attorney, Agent, or Firm* — Sughrue Mion, PLLC

(57) ABSTRACT

An apparatus (1) for the clocked longitudinal transport of workpieces (11) between processing stations in a transfer press. The apparatus has, at least on one side, a first (2) and a second (3) longitudinally movable control element as a control group (2, 3), wherein two control elements (2, 3) are mounted to be movable relative to each other solely in the longitudinal direction, and the control elements (2, 3) are driven via a common shaft (58). The first control element is a gripper rod (2) for the longitudinal transport of workpieces (11) between the processing stations, and gripper elements (4), offset in the longitudinal direction by the distance between the processing stations, are mounted in the gripper rod (2) and can be moved solely in the transversal direction. The second control element is a thrust rod (3) which forcibly controls the transversal movement of the at least two gripper elements (4).

31 Claims, 10 Drawing Sheets

(56) References Cited

FOREIGN PATENT DOCUMENTS

| | | |
|---|---|---|
| EP | 0 504 098 A1 | 9/1992 |
| EP | 0 694 350 A1 | 1/1996 |
| WO | 00/20305 A1 | 4/2000 |
| WO | 2004/110667 A1 | 12/2004 |

* cited by examiner

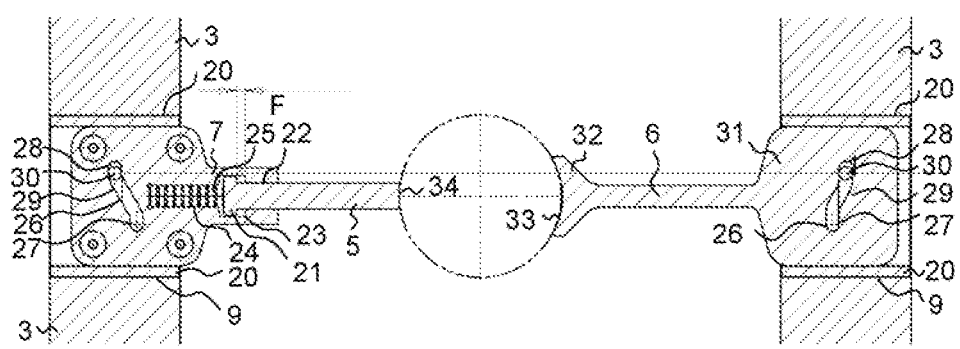
FIG. 6
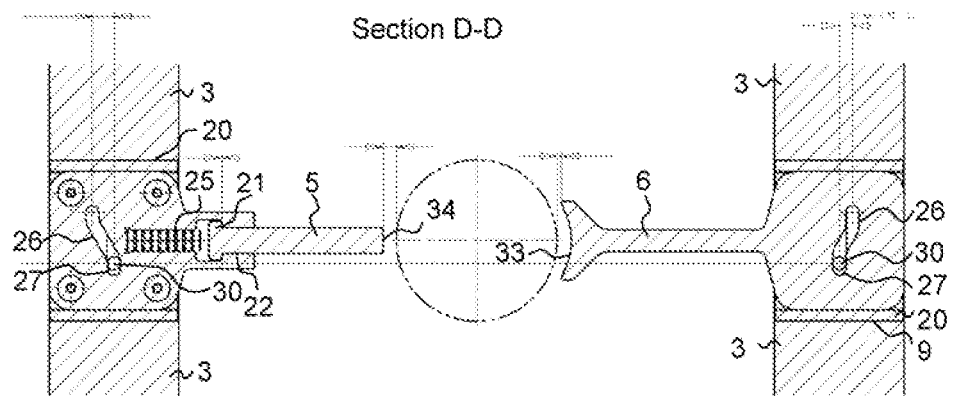
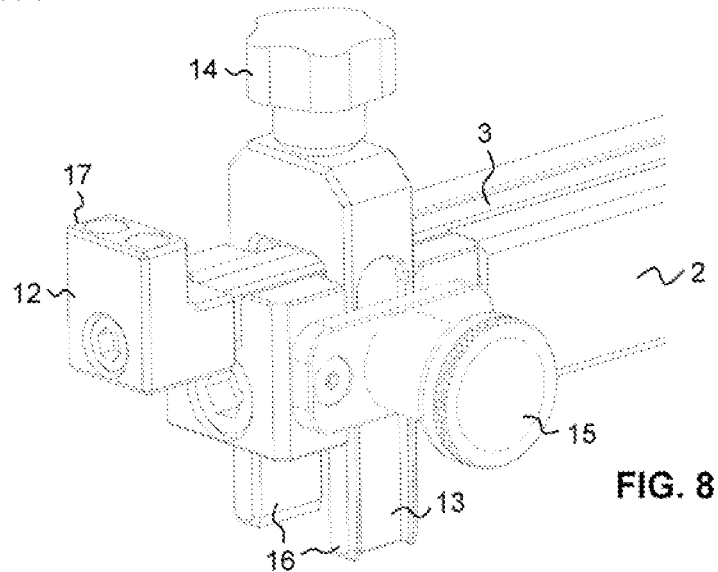
FIG. 7
FIG. 8

FEED APPARATUS FOR TRANSFER PRESS

CROSS REFERENCE TO RELATED APPLICATIONS

This application is a National Stage of International Application No. PCT/EP2020/055162 filed Feb. 27, 2020, claiming priority based on Europe Patent Application No. 19 160 179.8 of Mar. 1, 2019, Switzerland Patent Application No. 01589/19 of Dec. 11, 2019, and Switzerland Patent Application No. 01590/19 of Dec. 11, 2019.

TECHNICAL FIELD

The present invention relates inter alia to a feed apparatus for a transfer press, to a transfer press having a feed apparatus of this type, and to a method for operating feed apparatuses of this type. Apparatuses of this type are also referred to as transfer apparatuses.

As opposed to so-called progressive tools, transfer apparatuses are distinguished in that the part to be formed in the press in the region of the receiving station is first severed, for example from a continuous strip, for example by cutting or stamping, and is subsequently transported through the at least one processing station of the press independently of the movement of the continuous strip and in most instances also perpendicular to said movement.

The press is usually provided with a plurality of processing stations or forming stages, respectively, that are disposed in succession. In contrast, the part to be formed in progressive tools is transported from one forming stage to the other by its own continuous strip from which said part emanates.

PRIOR ART

Transfer presses are industrial units having a plurality of clocked presses for sequentially processing workpieces, wherein steps such as stamping, forming, wall ironing can in particular be sequentially performed in successively disposed processing stations, or else in part be simultaneously performed (in particular stamping and forming) on the same workpiece in one station, optionally in combination with other operations such as, for example, quality control, cooling, heating, etc. Apparatuses of this type can be operated at very high cycle rates and are above all used for producing metallic components in large volumes, for example in the automotive sector for structural components, in the furniture sector and in the telecommunications sector, or computer sector, respectively, likewise for structural components, or else in the foodstuff sector for producing containers such as, for example, pots, food trays, also coffee capsules from aluminum or tin sheet, for example. So-called transfer apparatuses are provided for the transport between the different processing stations. Said transfer apparatuses grip the workpiece to be processed after the respective operation has been completed, and transport said workpiece in the longitudinal direction to the position of the next processing station so as to then release said workpiece there at the correct point in time, that is to say typically at the point in time when a positioning element or an introduction element of the tool has engaged in the workpiece or is about to do so.

Transfer apparatuses of this type have to be capable of reliably transporting the workpieces between the stations at the high cycle rates in the short period of time in which the tool is opened, on the one hand, and on the other hand have also to be capable of not only gripping the workpiece in a positionally accurate manner at the correct location and of placing said workpiece again, but also of doing this such that metallic workpieces having minor wall thicknesses, for example, are in particular not deformed during transport and that rejects, or machine downtime, respectively, can be avoided. Accordingly, the transfer apparatuses do not only have to be optimally adapted to the stroke of the press, but also have to be provided so as to be very positively controlled and adjustable in terms of the transport path and of the treatment of the workpiece during the transport.

Transfer plants of the type described above are in principle known, for example from EP 490 821, EP 504 098, CH 688 128, EP 694 350, WO 00/20305, and WO 2004/110667. In EP 0 490 821 A1, the drive of the transport rods is performed by a mechanical coupling to moving parts of the press, specifically in the longitudinal direction by taking off the movement from the eccentric shaft of the press by way of a gearbox, and in the transverse direction by taking off the movement from the ram of the press by means of control rails, as a result of which high stroke rates in the range of 300 cycles per minute can be implemented. Even up to 700 cycles per minute are achieved for special applications in the can manufacturing sector. As a result of the mechanical coupling, collisions between the press tool and the transport means can also be largely prevented. For transporting, the parts to be formed are in each case gripped by two rigid grippers, longitudinally transported, and then released again at the next station for the next processing.

A reversible press for producing a plurality of deep-drawn metal containers is furthermore known from U.S. Pat. No. 4,404,837, said reversible press combining in one press the functions of blanking and cupping presses. The press contains a stamping and deep-drawing station, as well as a plurality of cupping and post-cupping stations disposed next to one another which, by a slide assembly which is movable in a vertically reciprocating manner, are disposed in series. The material, the semi-finished product or the finished product is under complete control in each phase of operation. A method for producing a cupped container by multiple shaping and forming of a cupped item is likewise provided.

U.S. Pat. No. 3,939,992 describes a workpiece transfer mechanism including a base having spaced parallel slides mounted in spaced parallel ways, bellcrank levers having their central portions pivotally mounted on the slides and having first portions pivotally mounting workpiece engaging members and having second portions connected by tie rods, with the force required to overcome the frictional engagement between the slides and the ways being greater than the force required to pivot the bellcrank levers, whereby the application of a unidirectional force to the tie rods will cause the workpiece engaging members to engage the workpiece prior to the time that the unidirectional force will cause the slides to move in the ways to transfer the workpiece from one position to another.

SUMMARY OF THE INVENTION

Accordingly, it is inter alia the subject matter of the present invention to provide an improved apparatus for the clocked longitudinal transport of workpieces between at least two processing stations in a transfer press, said apparatus being in particular suitable for high cycle rates and sensitive workpieces, for example metallic workpieces having minor wall thicknesses. It is furthermore the subject matter of the present invention to provide a transfer press having such an apparatus, and methods and uses in connection with such apparatuses.

This object is achieved by the subject matter of the appended claims.

According to a first aspect of the invention the apparatus is in particular characterized in that said apparatus at least on one side (in the transverse direction in terms of a sequence of processing stations in a transfer press) has a first control element and a second control element which are displaceable exclusively in a longitudinal manner. Such a combination of a first control element and a second control element which are displaceable exclusively in a longitudinal manner forms a so-called control group. The two control elements here are mounted so as to be mutually displaceable exclusively in the longitudinal direction, and both control elements are preferably driven by way of a common shaft.

The longitudinal direction here is defined as the direction in the tool along which the processing stations in terms of the sequence thereof are offset, and along which the workpieces are transported between the processing stations. The horizontal direction which is perpendicular to the mentioned longitudinal direction is understood to be the transverse direction. The latter is typically the direction of movement of the gripper elements described further below. The vertical direction is defined as the third direction; said vertical direction is perpendicular to the longitudinal direction and to the transverse direction.

According to the invention, the first control element is a gripper rod for the longitudinal transport of the workpieces between the processing stations, and at least two gripper elements which in the longitudinal direction are offset by the spacing between the respective processing stations of the press and in turn can be displaced exclusively in the transverse direction are mounted in the gripper rod.

The second control element is a thrust rod which positively controls the transverse movement of the at least two gripper elements, for example by way of a cam control.

In other words, the transfer apparatus at least on one side contains a control group which in each case contains one gripper rod and one thrust rod, both of said rods being displaceable only in the longitudinal direction. The thrust rod now positively controls the transverse movement of the gripper elements in the transport process, preferably by means (for example a cam control) which will be described further below. It is thus possible for the feed movement of the workpieces to be substantially controlled by way of the movement of the gripper rod, and in a synchronized manner thereto, by way of the thrust rod of the control group, the transverse movement of the gripper elements mounted in said gripper rod. As a result thereof, the process can be adjusted in an optimal manner to the clocking of the tool such that the transfer between the transfer apparatus and the tool (in both directions) takes place without malfunctions and in a controlled manner, also in the case of delicate workpieces, and also at high cycle rates and in particular also at the point in time or during the phase of the workpiece being gripped and released.

A first preferred embodiment of the proposed apparatus is characterized in that the thrust rod at least in portions is in each case mounted so as to slide in or on the gripper rod. This takes place, for example and preferably, in a longitudinal groove which at least in portions is preferably open toward the top and/or in portions is closed by covers. For example, this groove can extend across the entire length of the gripper rod, for example in the form of a rectangular groove, and the thrust rod as a corresponding rod can be inserted in this groove. In this arrangement, the sliding of the thrust rod can be facilitated in that roller bearings or ball bearings are provided, for example, on the gripper rod and/or the thrust rod, or by way of corresponding portions having friction bearings, for example from specially coated hardened steel.

The thrust rod and the gripper rod can be moved by way of two cam mechanisms which are driven by way of the common shaft but are individual to the respective rod. If there are a plurality of control groups, all thrust rods of these groups are preferably driven by the same cam mechanism, and all gripper rods are driven by the same cam mechanism. The two cam mechanisms for the thrust rod and the gripper rod, respectively, here preferably substantially generate identical or at least very similar movement, but by way of a respective relative displacement of phases prior to reaching, while reaching and/or upon reaching the two terminal positions.

According to a second aspect, the invention relates to an apparatus on a press for transporting in steps workpieces in a longitudinal direction from a receiving station through at least one processing station of the press by way of transport means for the workpieces, said transport means being at least in part or in regions moved back and forth in a cyclical and optionally also synchronous manner with the movement of the press in the longitudinal direction, and for acquiring or releasing, respectively, the workpieces in a transverse direction which is perpendicular to said longitudinal direction. The movement of the transport means in the longitudinal direction takes place by way of an external drive which is synchronized with the movement of the press. The motorized external drive takes place by way of a cam mechanism having a feed lever which is driven by said cam mechanism and moves the transport means back and forth in the longitudinal direction without reversing the rotation of the external drive. According to the invention, and according to this second aspect, the feed lever here, on the gearbox-proximal arm thereof, for coupling to the worm on the rotor of the cam mechanism possesses at least two cam rollers, wherein these cam rollers roll on the opposite flanks of the worm that are axial in terms of the axis of the rotor. This second aspect of the invention is preferably used in combination with the first aspect mentioned above, but can also be used independently of the latter, therefore also representing a separate invention.

In worm gears of this type, the worm and the element engaging thereon typically slide on one another in an oil bath. It has however been demonstrated that constructions of this type may be problematic at the high cycle rates which are required in the present applications and at the high acceleration rates associated therewith.

The proposed solution with the cam rollers unexpectedly proves to be simple, reliable and stable in terms of construction.

One preferred embodiment of the proposed construction is characterized in that the two cam rollers enclose an angle of at least 5°, preferably at least 10°, and the flanks of the worm are configured so as to converge toward the ridge of the worm and enclose a substantially identical or exactly identical angle as the one between the cam rollers. The cam mechanism can possess a lower housing in which the rotor is mounted, and an upper housing in which the feed lever is mounted, wherein the axis of the rotor is perpendicular to the axis of the feed lever.

The transfer-proximal arm of the feed lever here can protrude from the upper housing, wherein the passage opening in the upper housing is preferably sealed by a flexible seal.

It is thus particularly preferably possible for the thrust rod by way of the cam mechanism for the thrust rod in the forward movement to be entrained in a synchronous manner with the gripper rod until the gripper rod has reached the front terminal position, and for the thrust rod then, for releasing the workpieces, to be somewhat displaced rearward without any movement of the gripper rod (or by way of a simultaneous return movement which is slighter than that of the thrust rod). The exact longitudinal terminal position of the workpiece is thus predefined by way of the front terminal position of the gripper rods, and the release movement of the grippers is decoupled therefrom and implemented by way of the thrust rod.

In an analogous manner in terms of the return movement, here too the thrust rod in the return movement can be entrained in a synchronous manner with the gripper rod until the gripper rod has reached the rear terminal position so as to then displace the thrust rod somewhat forwards for releasing the workpieces without any movement of the gripper rod (or by way of a simultaneous forward movement which is slighter than that of the thrust rod) in order to close the grippers. The exact longitudinal transfer position for the workpiece is thus predefined by way of the rear terminal position of the gripper rods, and the gripping movement of the grippers is decoupled therefrom and implemented by way of the thrust rod.

The transverse movement of the gripper elements for gripping or releasing, respectively, the workpieces can then be controlled in a targeted, optimal manner at the right point in time of the process, exactly in this portion where a phase displacement takes place, by way of a corresponding gate (cam control) between the thrust rod and the gripper elements.

For implementing such a control, the gripper elements preferably possess at least one recess or through opening which in the form of a gate is preferably open in the vertical direction, and the thrust rod possesses an extension which, so as to positively control the transverse movement of the gripper elements, engages in this gate in each case at the position of the corresponding gripper element, or possesses a preferably vertical pin which engages in such a manner.

In the context of a kinematic reversal, it is alternatively possible for the thrust rod to have at least one recess or through opening which in the form of a gate is open in the vertical direction in each case at the position of the corresponding gripper element, and for the gripper elements to have an extension or a corresponding pin which, so as to positively control the transverse movement of the gripper elements, engages in this gate.

The extensions or pins, respectively, preferably possess a circular cross-sectional area so as to slide in an optimal manner in the gate.

The gate in the gripper elements can have in each case a first region for a retracted gripper element and a second region for a deployed gripper element and a displacement range connecting these two regions. The first region in the gripper element in the transverse direction here is preferably disposed so as to be closer to the workpiece than the second region, and the displacement range is configured as a linear or curved, in particular S-shaped, connecting duct or connecting through opening. The first region and/or the second region can run in a linear manner across a specific longitudinal length, and the ends of the gate typically preferably terminate by way of a curvature which corresponds to the outline of the corresponding guide pin.

The apparatus, preferably on both sides of a longitudinal row of processing stations, possesses first and second control elements of this type, thus control groups, wherein the transverse movement of the respective transversely opposite gripper elements are positively controlled in a mirror-symmetrical manner in terms of the workpiece position. To this end, corresponding gates in the form of recesses or through openings are preferably configured so as to be mirror-symmetrical in terms of the central longitudinal axis of the tool. Such an apparatus is preferably characterized in that said apparatus is provided for the transport between at least two, preferably 2 to 5 or 2 to 4, longitudinal rows (the rows being offset in the transverse direction) of processing stations of the same transfer press, and has a number of respective first control elements and second elements that is greater by one than the number of rows of processing stations. Control groups which lie in each case between two rows thus make available the functionality in both transverse directions, that is to say simultaneously support the grippers for both sides and control said grippers for both sides, preferably by way of only one gripper rod and only one thrust rod. The processing stations of tools which are disposed in adjacent rows here are preferably not at the same height in the longitudinal direction, but offset in an alternating manner, for example.

The first control elements which are disposed between rows of processing stations preferably mount gripper elements that protrude in both transverse directions, and the second control elements, preferably simultaneously, positively control the gripper elements simultaneously in both transverse directions. The gates in the gripper elements protruding in different transverse directions here are preferably configured so as to be mirror-symmetrical in terms of the longitudinal direction. In particular in the case of sprung grippers (cf. discussion further below) it is however also possible for the gates in the different transverse directions to be designed such that the gripper elements do not contact the workpiece in a mirror-symmetrical manner but consequently in a temporally offset manner. The first control elements disposed between rows of processing stations preferably have transversely running through openings in which the gripper elements, or gripper carriers of gripper elements, are displaceably mounted. Gripper elements in the longitudinal direction are normally in each case mounted in an alternating manner in the one transverse direction and the other transverse direction.

The first control elements of the control groups disposed in parallel, in terms of the movement thereof, are preferably controlled by way of a common, transversely running, coupling crossbar for the gripper rods, and the second control elements are preferably controlled by way of a common, transversely running, coupling crossbar for the thrust rods. The coupling crossbar for the gripper rods here, preferably by way of at least one coupling rod, is linked to a cam mechanism for the gripper rods, and the coupling crossbar for the thrust rods, preferably by way of at least one coupling rod, is linked to a cam mechanism for the thrust rods.

At least one of the gripper elements per se, or on a gripper pin, for at least partially circumferentially encompassing the workpiece, preferably has a fork-shaped and/or curved gripping region that faces the tool, wherein the gripping region is preferably adapted to the radius of the workpiece in the corresponding transport section.

Or at least one of the gripper elements has a substantially planar gripper tip that faces the workpiece. When circular-symmetrical workpieces, for example containers or portions of cans, are to be transported between the processing stations, gripper elements which are opposite in terms of the workpiece and grip the same tool, preferably have a substantially planar gripper tip on the one side and a fork-shaped and/or curved gripping region on the other side.

At least one of the gripper elements can have a gripper carrier which is mounted in the gripper rod so as to be exclusively transversely displaceable and in this gripper carrier, so as to be displaceable, has a gripper pin which is preferably elastically braced, preferably by way of a spring, in particular a helical spring, or by way of compressed air or an elastomer spring, in relation to the workpiece, wherein the restoring action is preferably designed so as to be adjustable.

In other words, such an apparatus according to a further embodiment, or a third aspect of this invention, respectively, is characterized in that the workpieces between the processing stations are gripped on both sides by a respective gripper, in the gripped state are transported in the longitudinal direction to the next processing station, and in the next processing station are released again, and in that at least one of the grippers is configured so as to be sprung and to have an elastic restoring force in relation to the workpiece. This third aspect is to be considered to be an invention independently of the specific features of the transfer apparatus mentioned above, but is preferably used in combination with the features of the transfer apparatus mentioned above. These sprung grippers, according to this third aspect of the invention, can correspondingly also be used in the context of an apparatus for transporting workpieces in steps in a longitudinal direction from a receiving station through at least one processing station of the press, by way of transport means for the workpieces, said transport means being at least in part or in regions moved back and forth in a cyclical and synchronous manner with the movement of the press in the longitudinal direction, and for acquiring or releasing, respectively, the workpieces in a transverse direction which is perpendicular to said longitudinal direction. The apparatus here by the spring action is in particular improved in terms of the gripping of the workpieces.

The transport means here can be configured in the form of rods, and the grippers can be fixedly fastened to these rods. In this instance, the transport means as an entity move in the longitudinal direction as well as in the transverse direction, in a rectangular movement, so to speak. However, the transport means can also be designed such that the grippers are movably fastened to rods of this type, the rods in this instance consequently only carrying out longitudinal movements, and the grippers carrying out a separate transverse movement on these rods. This transverse movement can either be actively controlled, or said transverse movement can also be controlled in that the workpieces are pushed between the grippers.

As a result of the sprung configuration of the grippers, a substantially more flexible and reliable process management is possible, and it is furthermore possible for dissimilar materials, also soft materials, to be processed in such apparatuses.

A first preferred embodiment of the proposed invention according to this third aspect is characterized in that the spring action of the at least one gripper is formed by an elastic spring element, wherein this spring element is preferably formed by a leaf spring, compressed air, a helical spring, or an elastomer spring.

A further preferred embodiment of the proposed apparatus is characterized in that sprung grippers are disposed on both sides of the workpiece.

A sprung gripper can be disposed on only one side of the workpiece, and an unsprung gripper can be disposed on the opposite side.

The transverse movement of the transport means, respectively gripper elements, disposed on opposite sides of the workpiece in this instance is preferably not positively controlled so as to be mirror-symmetrical in terms of the workpiece position, wherein controlling of the transverse movement thus preferably takes place in an asymmetrical manner. As a result thereof, the unsprung gripper does not run onto the part because said unsprung gripper only approaches the part. The sprung gripper (later) runs asymmetrically to the position in order for the part not to be pushed out of position as a result of the spring force. The impact velocity is defined by the shape of the drive cam of the gripper.

As a function of the corresponding processing stations, the regions of the gripper elements, or of the gripper pins mounted in a gripper carrier, respectively, that contact the respective workpiece in the vertical direction can be disposed at dissimilar heights, preferably in that the gripper elements, or the gripper pins, respectively, have two horizontal portions and a vertical portion connecting said two horizontal portions.

The present invention furthermore relates to a method for transporting workpieces between different processing stations of a transfer press, said method being in particular characterized in that at least one apparatus as described above is used for the transport between the stations.

This here is a method for producing workpieces in steps, in particular proceeding from a flat initial material, preferably from metal, particularly preferably steel or aluminum, that is supplied in the form of a strip, while using an apparatus as set forth above.

The method is preferably characterized in that the workpiece, preferably after a first stamping step and a subsequent first forming step, is gripped at least once from both sides by a gripper pair and transported to a downstream processing station.

Both grippers here can be configured so as to be sprung, and the transverse movement of the transport means can at least partially or exclusively consist in that the workpieces by the processing tool at this processing station, counter to the spring force of the grippers, is pushed into the latter for mounting. Or the method can be characterized in that only one of the grippers is configured so as to be sprung, and in that the transverse movement of the transport means, or gripper elements, respectively, disposed on opposite sides of the workpiece is positively controlled so as not to be mirror-symmetrical in terms of the workpiece position, wherein controlling of the transverse movement preferably takes place in an asymmetrical manner such that the impact velocity of the sprung gripper on the part is less than the impact velocity of the non-sprung gripper.

The present invention moreover relates to a transfer press having an apparatus as described above, preferably a transfer press having a plurality of rows of processing stations that are offset in the transverse direction.

Last not least, the present invention relates to the use of an apparatus as described above in a transfer press, preferably a transfer press having a plurality of rows of processing stations that are offset in the transverse direction.

The present invention furthermore relates to a workpiece, in particular a pot-shaped, stamped and formed workpiece, preferably from metal, produced while using an apparatus as illustrated above, or by a method as explained above.

Further embodiments are set forth in the dependent claims.

BRIEF DESCRIPTION OF THE DRAWINGS

Preferred embodiments of the invention will be described hereunder by means of the drawings which serve only for the purpose of explanation and are not to be interpreted as limiting. In the drawings:

FIG. 6 shows the section along C-C in FIG. 4 (bottom);

FIG. 7 shows the section along D-D in FIG. 5;

FIG. 8 shows a perspective view of the coupling region of a gripper rod;

DESCRIPTION OF PREFERRED EMBODIMENTS

Figure 1:
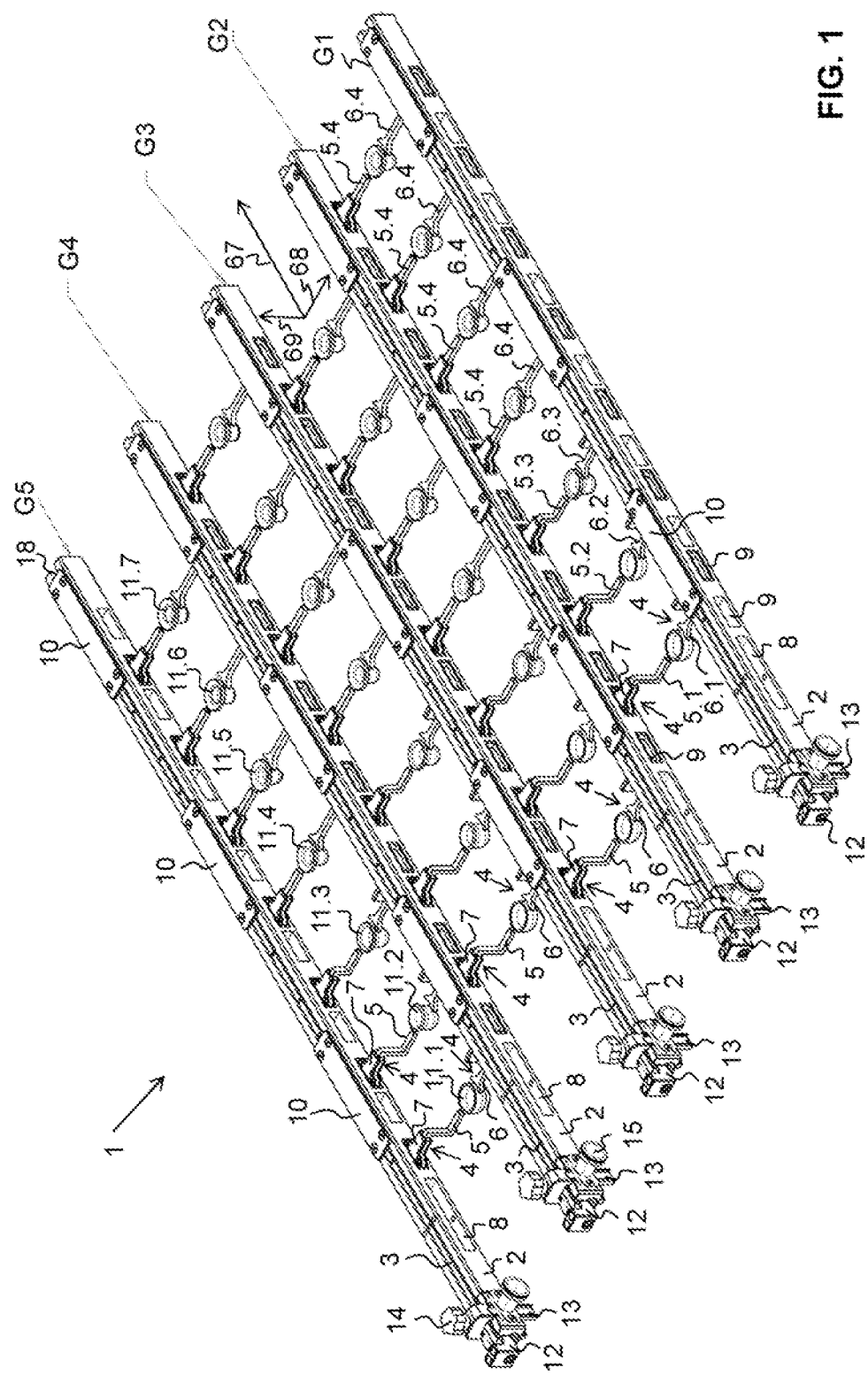
FIG. 1 shows a transfer apparatus in a perspective view, having five gripper rods for four processing lines having seven stations in each line.

A feed apparatus is reproduced in a perspective illustration in FIG. 1, wherein the feed apparatus 1 is conceived for a press having four processing lines which are in each case offset in the transverse direction 68.

The transfer apparatus along the longitudinal direction 67 is in each case provided for seven processing stations of the pressing tool, said processing stations implementing different processing steps on the workpiece.

Likewise illustrated in an exemplary manner in FIG. 1 are workpieces in the different processing stations, despite said workpieces not being gripped by the grippers. The workpiece 11 is a pot-shaped component which in the first processing station (to the extreme left in the figure) is formed to a pot-shaped blank 11.1. In this step, a corresponding circular portion of sheet metal in the same tool is typically stamped and then cupped so as to form a pot 11.1 in direct succession.

The next processing station then follows so as to be offset in the longitudinal direction 67; the pot-shaped component here is further formed to the component 11.2.

Further processing steps thus follow for the components 11.3, 11.4, 11.5, 11.6 and 11.7 formed in stages. The last stage in which the component 11.7 is illustrated is often not a further processing stage, but the component 11.7, which then is identical to that illustrated by way of 11.6, here is only transported to the corresponding position and either transferred to another handling apparatus or released and allowed to drop into a corresponding guide. The feed apparatus 1 now possesses control groups which are in each case configured in the form of rods, wherein there are two outer control groups G1 and G5 which in each case possess grippers only on one side, said grippers being directed inward, in a manner of speaking. The control groups G2 to G4, disposed between two rows, serve in each case simultaneously the two processing stations which in the transversal direction lie next to said control groups G2 to G4.

Such a control group G is in each case constructed from a gripper rod 2 and a thrust rod 3 which is guided in a longitudinal groove 18 that is open toward the top. This groove 18 is in portions in each case covered by covers 10. The cover 10, as is illustrated here, can be configured in individual portions only in regions; the cover 10 can however also be configured across substantially the length of the entire gripper rod 2.

The gripper rods 2 possess transverse through openings 8 and 9. Certain ones of these through openings, specifically the first through opening, so to speak, which is indicated by the reference sign 8 does not have any respective particular function. However, the row of transverse through openings 9 that follows in the longitudinal direction serves for receiving the gripper elements 4 and mounting the latter so as to be transversely movable.

The gripper elements 4 on the one side are in each case constructed from a gripper carrier 7 in which a gripper pin 5 is mounted. The gripper carrier 7 is in each case mounted so as to slide in a through opening 9 of the gripper rod. Only every other through opening in the outer gripper rods G1 and G2 is in each case equipped with one gripper element. The through openings lying therebetween are vacant.

This is different in the case of the gripper rods G2 to G4 that lie between in each case two processing lines. Here, gripper elements 4 are in each case mounted in an alternating manner in the through openings 9, said gripper elements 4 in an alternating manner protruding from the gripper rod 2 in different transverse directions and serving the two different processing lines on both sides.

In order for this transfer apparatus to be able to be used, the tools of the four rows of processing lines which here are provided next to one another, are correspondingly not all disposed on one line in the transverse direction but are in each case offset in an alternating manner by the offset of the transverse through openings 9.

The different processing stations along the line in the longitudinal direction optionally process the workpieces at different vertical heights, or the workpieces have to be gripped at different vertical positions, despite the tools being disposed at the same height, respectively. For this purpose, the gripper elements 4 are in each case configured in stages, thus in the first processing station so as to be offset downward to the maximum in order for the workpiece 11.1 to be gripped, then successively further upward until the position at the workpiece 11.4, and then always at the same vertical height until the last position.

The thrust rod at the entry-proximal end possesses in each case a coupling element 12, the function of the latter being set forth further below. In an analogous manner, each gripper rod 2 possesses in each case one coupling element 13 which here is directed vertically downward.

Corresponding set screws 14 and 15 permit an optimal adjustment of the gripper rod as well as of the coupling element.

The gripper elements 4, which in FIG. 1 in each case protrude on the right-hand side from the respective gripper rod, are developed from two elements, as set forth above, said two elements being a gripper carrier 7 in which a respective gripper pin 5 is mounted. The opposite gripper elements 4, which in the gripper rods G1 to G4 in FIG. 1 protrude toward the left, or obliquely to the top left, respectively, are not configured in two pieces but are configured as integral gripper forks 6. These gripper forks 6 possess curved gripping regions which are to be set forth in more detail below; as opposed to the ends of the gripper pins 5 that face the workpieces, these are without any guiding function in the longitudinal direction.

Figure 2:
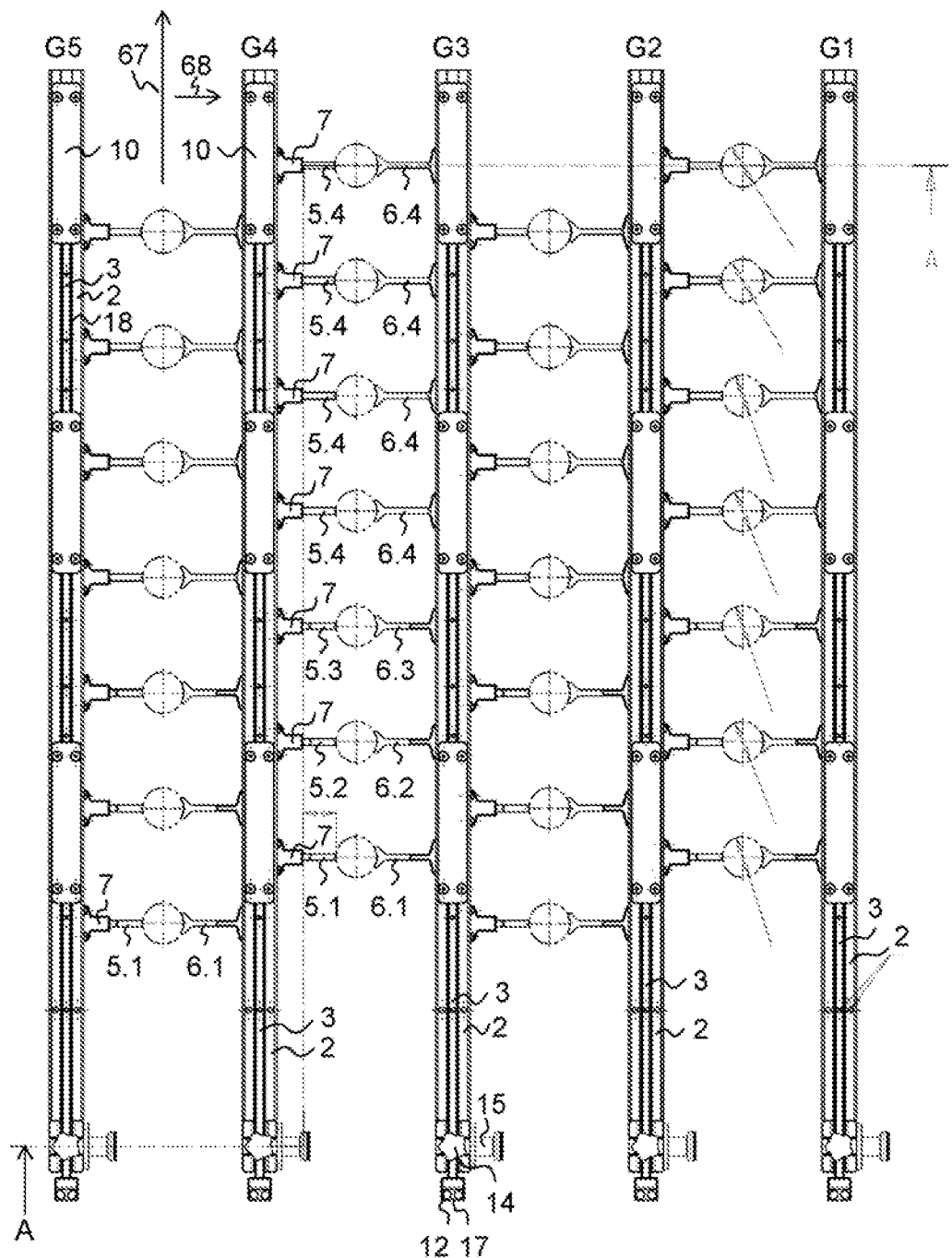
FIG. 2 shows the transfer apparatus as per FIG. 1 in a plan view, having closed grippers.

FIG. 2 shows such a feed apparatus in a view from above in the position in which the grippers are in each case closed, consequently gripping in each case in a clamping manner the workpiece which here is in each case only schematically illustrated. This is the position at which the feed apparatus is fixed, in a manner of speaking, in that temporal interval in which the workpieces are transported between the individual processing zones. It can moreover be seen in this figure how the grippers in adjacent rows are in each case offset in the longitudinal direction, precisely such that it is possible for the gripper elements 4 to be optimally mounted in the transverse through openings 9 of the gripper rods 3 in the rods G2 to G4.

Figure 3:
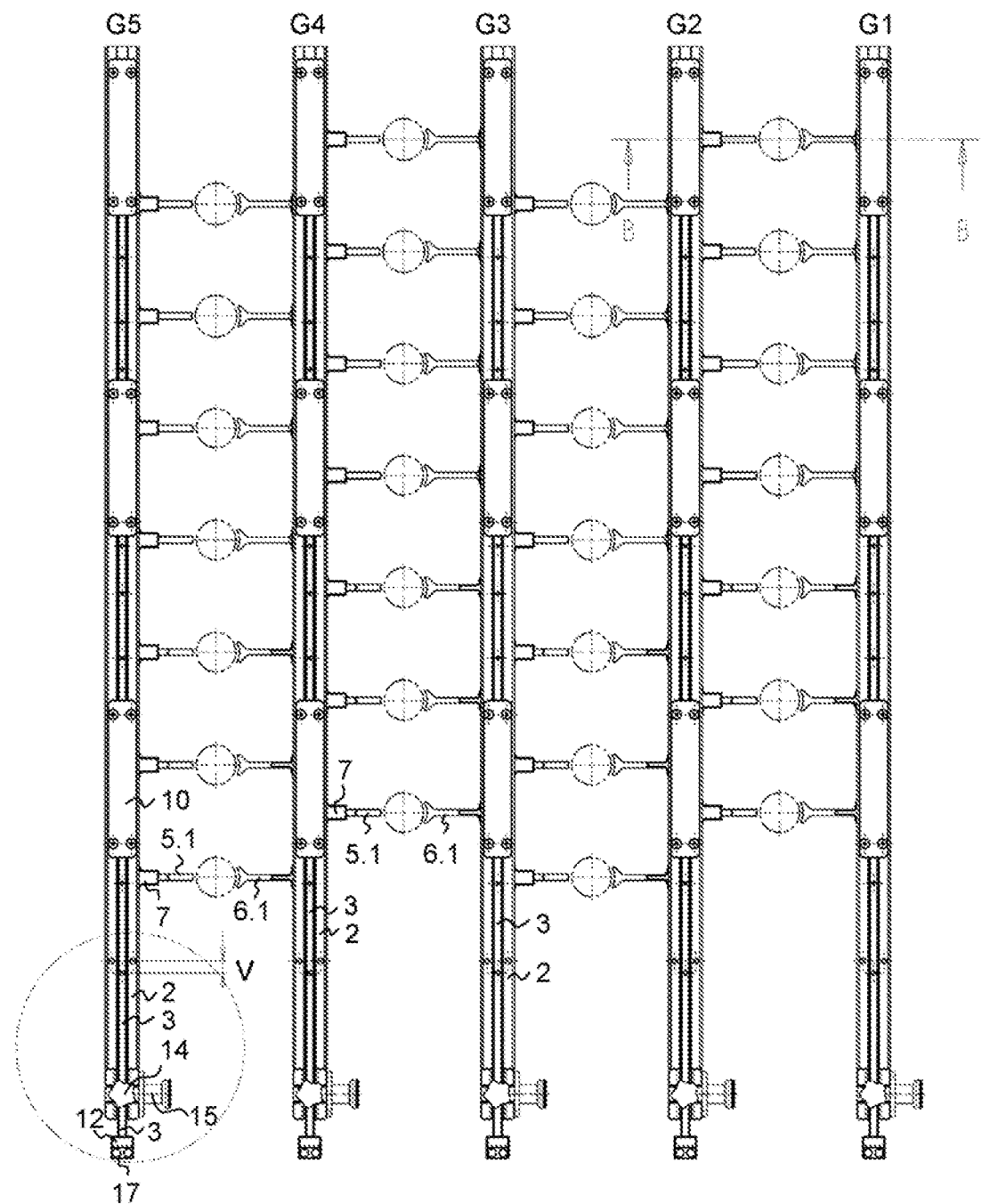
FIG. 3 shows the transfer apparatus as per FIG. 1 in a plan view, having opened grippers.

FIG. 3 likewise shows such a feed apparatus, but now in the open position, in a manner of speaking, that is to say in the position in which the gripper elements are in each case retracted and do not hold the workpiece. This is the position just prior to gripping the workpiece before a transfer step, or the position upon releasing the workpiece at the end of the transfer step, respectively. This is also the position in which the return movement of the feed apparatus is carried out.

Figure 4:
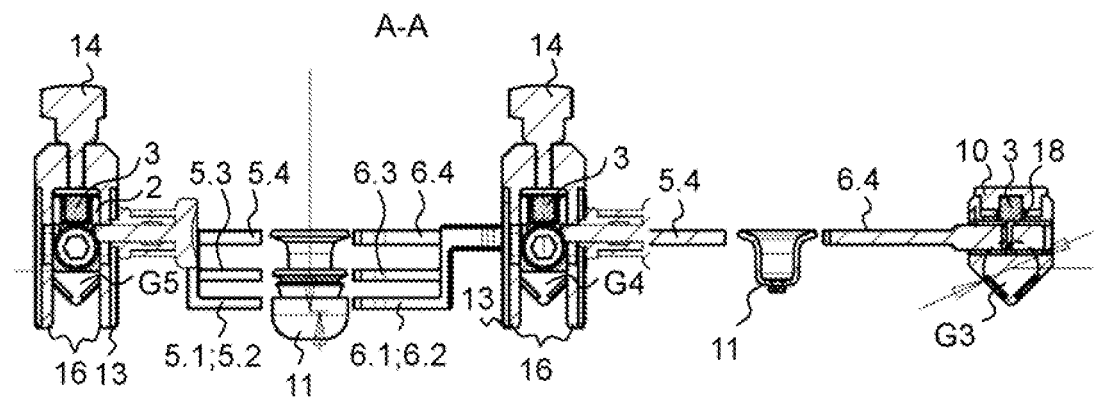
FIG. 4 shows the section along A-A in FIG. 2.
Figure 4:
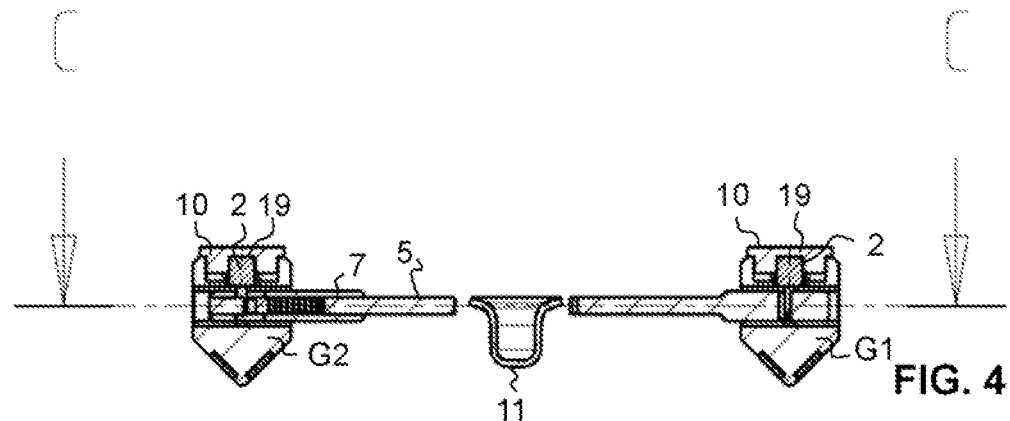

FIG. 4 shows the section along the line A-A as set forth in FIG. 2. It can be seen here how the gripper pins are disposed at dissimilar vertical heights. The gripper pin 5.1, and the one of the next station, that is to say the gripper pin 5.2, are disposed at the extreme vertical bottom and correspondingly grip the pot-shaped workpiece at the lowest vertical point. A central height then follows in the third station; the gripper pin here is identified by the reference 5.3, and the linear gripper pins 5.4-5.7 then follow. This applies for the respective left side where the gripper elements are constructed from two parts, the gripper carrier 7 and the gripper pin 5. The corresponding gripper forks 6 on the opposite side is likewise configured in stages, in the first station in the form of the gripper forks 6.1 and 6.2, in the central vertical gripper position as the gripper fork 6.3, and subsequently as gripper forks 6.4 for the following stations 4-7.

It can moreover be seen in FIG. 4 how the coupling element 13 for the gripper rod 2 is in each case configured in the form of a fork, having the two fork arms 16 which project downward. It can furthermore be seen how the thrust rod 3 is configured as a solid rod having a square cross-sectional area and slides in the groove 18 in the gripper rod 2. It can furthermore be seen by means of the sectional illustrations at G1 to G3 how the covers for improved guiding of the gripper rod likewise possess a longitudinal groove 19 which is open toward the bottom.

It can moreover be seen, in particular by means of the sectional illustration at G2 in FIG. 4, how the guide pin 5 is mounted so as to be sprung in a recess provided therefor in the gripper carrier 7; this will be set forth in detail further below. It can furthermore be seen how the gripper rods 2 in a downward manner possess a v-shaped profile, the latter lying in a sliding manner in a v-shaped groove in a support structure which is stationary, for example, such that the gripper rods can slide in a controlled manner therein. As is indicated by correspondingly darker regions, particular friction elements or coatings, for example from PTFE, can be provided for this purpose in or on the lower faces of the gripper rods.

Figure 5:
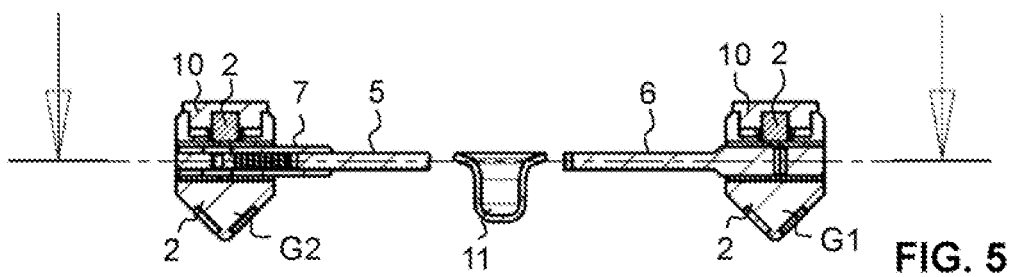
FIG. 5 shows the section along B-B in FIG. 3.

A section along the line B-B in FIG. 3 is illustrated in FIG. 5. The open and position of the grippers is consequently illustrated here, this can also be seen in that the gate openings 26, discussed further below, in terms of the thrust rods 2 are now in each case illustrated so as to be laterally on the outside.

The section along the line C-C in FIG. 4 (bottom) is illustrated in FIG. 6. The positive control of the gripper elements and the specific configuration of the gripper elements for the closed state can be seen in this sectional illustration. The open state is illustrated according to the step D-D in FIG. 7.

Referring first to FIG. 6, it can be seen here how the gripper carrier 7 is mounted in the respective gripper rod 2 in the transverse through opening 9 on the left side. Friction plates can be provided for an enhanced displacement capability of the gripper carrier 7, specifically not only in each case in the longitudinal direction on the delimitation walls, as can be seen here, but also in the vertical direction, that is to say at the top and the bottom in the recess 9 in the respective gripper carrier 7. Such a gripper carrier 7 by way of its region on the left side slides in the recess 9, and the gripper carrier on the right side tapers so as to form an appendage which has a recess 22 in the form of a blind bore for the gripper pin. The gripper pin 5, at the end thereof that faces away from the workpiece, has a piston-shaped extension 21; this piston 21 is provided in an extension region of the passage 22 in the gripper carrier 7. A spring element 25 in the form of a helical spring is provided in the internal region 24 of the passage 22. This helical spring 25 braces in each case the gripper pin 5 in relation to the workpiece, until the piston 21 impacts the extension 23 of the passage 22. An ideally gentle and always optimum gripping force on even sensitive workpieces can be adjusted by this optionally adjustable spring 25.

The gripper pin 5, at the end facing the tool, possesses a gripper tip 34 which is configured so as to be linear, that is to say runs along the longitudinal direction. This gripper element 4 thus has a clamping effect only in the transverse direction and no guiding effect in the longitudinal direction.

The above is in contrast to the integral gripper forks which are disposed opposite and are indicated by the reference 6. Said gripper forks, at the end thereof that faces the workpiece, possess a fork region 32 in the form of an extension, and the region of this extension that faces the tool is provided as a curved gripping region 33, preferably having a curvature which is adapted to the curvature radius of the workpiece at this position.

The gripper carrier 7 as well as the rearward region of the gripper fork 6, that is to say the extension 31, now possess the vertical gate openings 26 which are important in the present context. These gate openings 26 serve for positively controlling the transverse position of the gripper elements 4 by the thrust rod 3. To this end, the gate openings 26 are configured so as to be round in stages in the transverse direction. There is a region of the detent position 27 for the retracted gripper, and a region of the detent position 28 for the deployed gripper. The position 27 is in each case disposed so as to be proximal to the workpiece, and the deployed position 28 in the transverse direction is offset so as to be further outward from the workpiece. There is therebetween a connecting region, or a displacement range 29, which connects the regions 27 and 28 to one another.

The gate openings 26 in the opposite gripper carriers 7, or extensions 31, respectively, are configured so as to be mirror-symmetrical in terms of the longitudinal axis 67.

A vertical gate pin 30 which is fixedly fastened to the thrust rod 3 and from the latter protrudes downward into the gate opening 26 now runs in this gate 26. When the thrust rod 3, proceeding from the position illustrated in FIG. 6, is displaced downward, or rearward in the longitudinal direction in the feed apparatus of the tool, respectively, the vertical gate pin thus travels downward conjointly with said thrust rod 3. Said vertical gate pin 30 cannot be displaced in the transverse direction; accordingly, the gripper carrier 7 on the left side, as a result of the travel of the pin 30 in the gate 26, in response moves toward the left. When the thrust rod 3 on the right side is also displaced downward, the pin 30 in analogous manner thus moves downward, and the rearward extension 31 is displaced to the right as a result of this cam control. The position illustrated in FIG. 7 is thus achieved. The grippers are now opened.

This controlling can either take place in that the thrust rod 3, with the stationary gripper rod 32, is displaced downward, as is described above, or else in that the thrust rod 3 remains fixed and the gripper rod 2, proceeding from the position FIG. 6, is displaced further upward than the thrust rod 3.

The controlling of the gripper movement in the transfer process is now implemented such that the gripped workpiece, proceeding from the position in FIG. 6, is moved to the next processing station by a synchronous longitudinal movement of the gripper rod and the thrust rod. Once the next position has been reached, the thrust rod 3 is somewhat moved back, without any movement of the gripper rod, specifically by a longitudinal offset which corresponds to the longitudinal spacing between the positions 27 and 28. The thrust rod 3 thus moves somewhat back relative to the gripper rod 3, and as a result thereof the workpiece, owing to the transition which is illustrated in FIGS. 6 and 7, by way of the pin 30 is automatically released at the correct position by the controlling action in the gate 26. Once the workpiece has been released, the transfer apparatus in a position as is illustrated in FIG. 7 now moves back to the first processing station. Once the gripper rod has reached the terminal position, the thrust rod 3 is now in turn moved forward, without any movement of the gripper rod, specifically by the longitudinal offset between 27 and 28 such that the workpiece can be gripped at the correct moment in what is again the first processing station, the grippers consequently closing, this corresponding to the transition from FIG. 7 to FIG. 6.

The relative movements of the thrust rod 3 and of the gripper rod 2 in each case, in the portion of movement briefly after arriving at the transfer position and briefly after arriving at the changeover position, are thus somewhat phase-displaced, and the thrust rod 3 by way of another path, this being implemented by cam mechanisms which are set forth further below.

Figure 12:
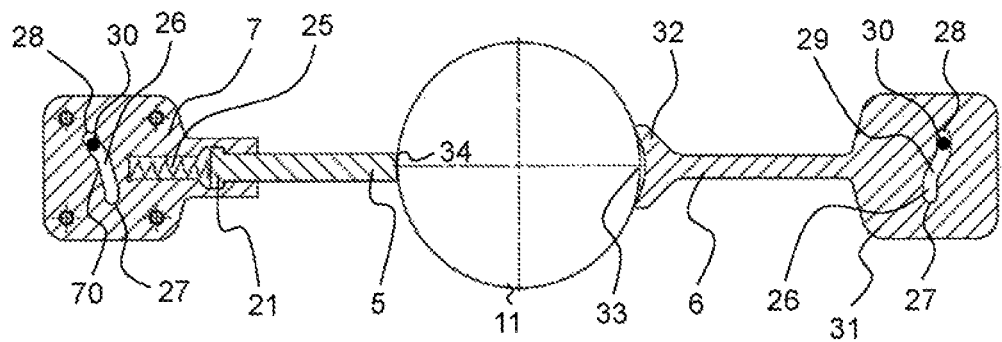
FIG. 12 shows the asymmetrical control of the transverse movement of the grippers.

The asymmetrical guiding of the transverse movement is now illustrated in FIG. 12 for the situation in which one of the grippers is configured so as to be sprung (on the left side). The gripper illustrated on the right side is of the identical configuration as the gripper which has been discussed in the context of FIG. 7. The opposite sprung gripper in terms of the construction mode is likewise fundamentally analogous to the gripper which has been illustrated in FIG. 7, but said opposite sprung gripper differs from the construction mode according to FIG. 7 in terms of the gate opening 26. While the gate openings of the two opposite grippers in FIG. 7 are configured so as to be symmetrical, the gate opening 26 of the sprung gripper here, between the two detent positions 27 (retracted position) and 28 (closed position) is connected by way of an arcuate curved region 70. Consequently, there are initially no regions between the two terminal positions in the gate opening in which no lateral displacement of the gripper takes place and therebetween a short displacement range 29, but the displacement takes place more slowly across the entire curved region 70 between the two detent positions 27/28. As a result of this asymmetrical guiding, it is taken into account that a sprung gripper 5 is disposed on the one side and a non-sprung gripper 6 is disposed on the other side.

FIG. 8 shows the coupling region of the gripper rod 2 and the thrust rod 3, in particular the coupling elements 13 and 12, in a perspective view. To be seen is in particular the upwardly directed protrusion 17 of the coupling element 12, said protrusion 17 serving for engaging in a crossbar.

Figure 9:
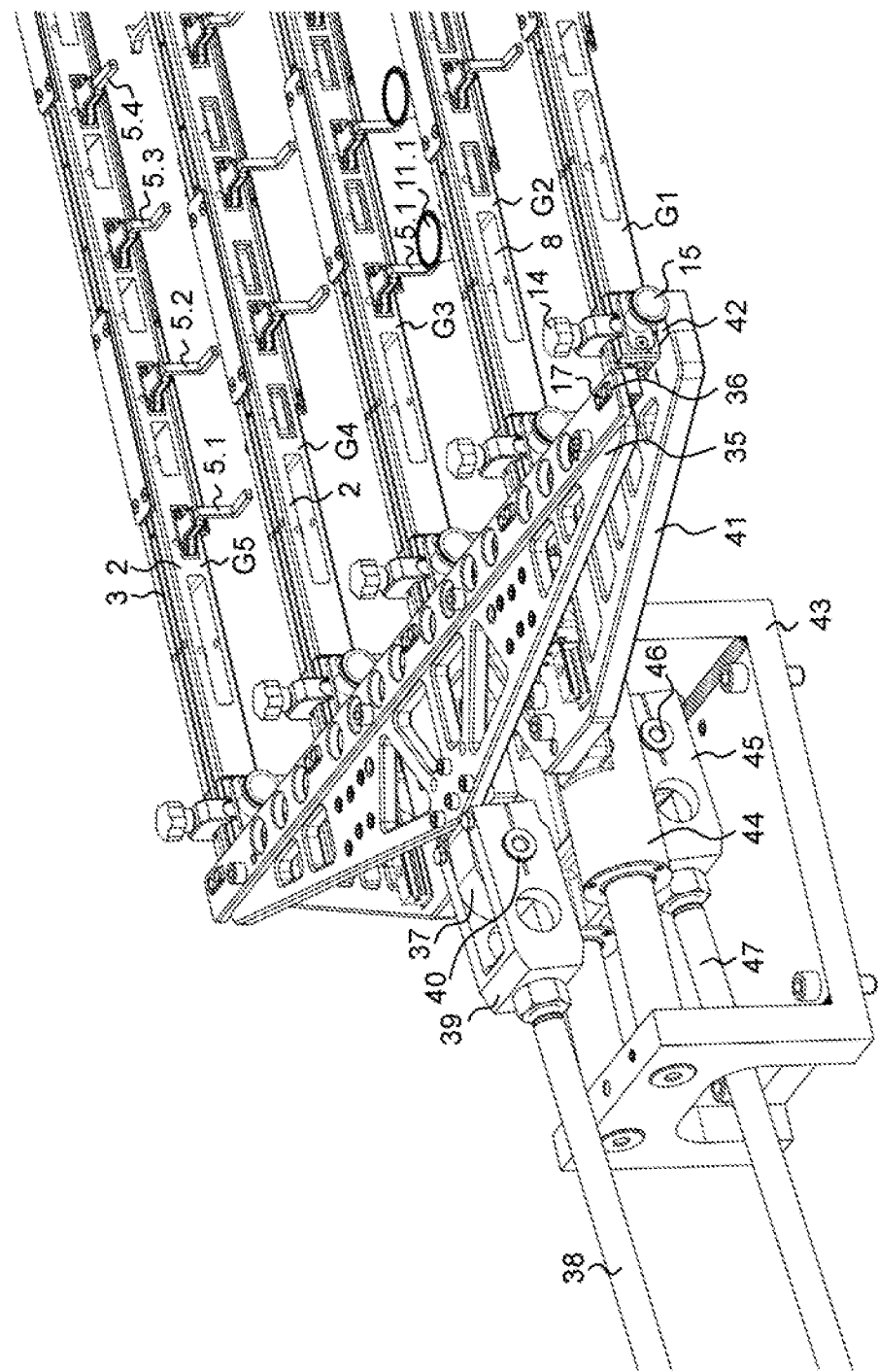
FIG. 9 shows a perspective view of the coupling region of the entire transfer apparatus, having five gripper rods.

It is illustrated in FIG. 9 how all of the thrust rods 3 of the control groups G disposed in a row in the transverse direction are moved in terms of the longitudinal direction of said thrust rods 3 by way of a coordinated common apparatus. For this purpose, there is a coupling crossbar 35 which possesses vertical recesses 36 in which the respective upwardly directed protrusion 17 of the thrust rods 3 engage. The transversely running coupling crossbar 35 by way of a rotary joint 37 and by way of an axle 40 is coupled to a fork element 39 which is linked to a coupling rod 38. In other words, a back and forth movement of the coupling rod 38 moves the entire coupling crossbar 35 and thus also, in a synchronized manner, all thrust rods of the five gripper carriers G1 to G5.

In analogous manner, the gripper rods 2 are controlled in a synchronous manner by a common coupling crossbar 41, the latter in turn possessing vertical recesses 42 in which the respective coupling elements 13 by way of the fork arms 16 thereof engage from above. This coupling crossbar 41 is likewise common to all gripper rods of the entire feed apparatus and in turn is linked to a coupling rod 37 by way of an axle 46 and a coupling joint 45. The coupling crossbar 41 here runs on a guide cylinder 44 which is received in a carrier element 43.

Figure 10:
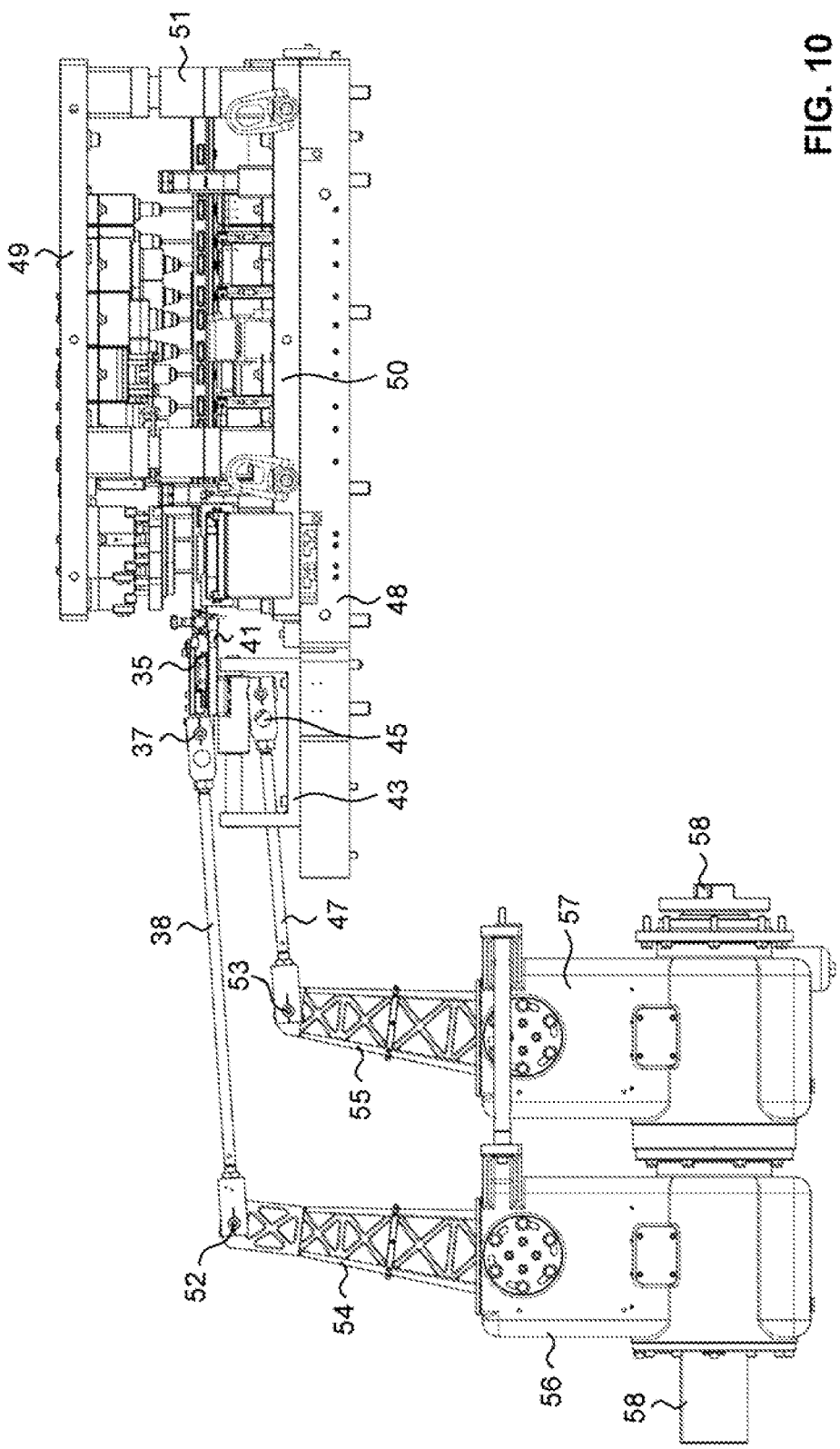
FIG. 10 shows a lateral view of an entire transfer press having processing stations, a transfer apparatus, as well as a gearbox and coupling elements for driving the transfer apparatus.

FIG. 10 shows how the movement of the two crossbars 35 and 41 are controlled in the overall context. The illustration additionally shows the upper tool plate 49 and the lower tool plate 50 of the entire press, and the guide columns 51 between these two plates.

Furthermore a lower carrier plate 48 of the entire transfer unit on which the carrier unit 41, already mentioned, is also fastened.

The movement of the entire feed apparatus is now implemented by way of a common drive axle 58. The latter drives two different cam mechanisms 46 and 47. The cam mechanism 56 serves for controlling the thrust rods, and the cam mechanism 57 serves for controlling and moving the gripper rods and moving the gripper rods. The cam mechanisms are in each case diverted to the coupling rods 38 and 47, respectively, by way of gearbox levers 44 and 55, respectively, and deflections 52 and 53, respectively.

Figure 11:
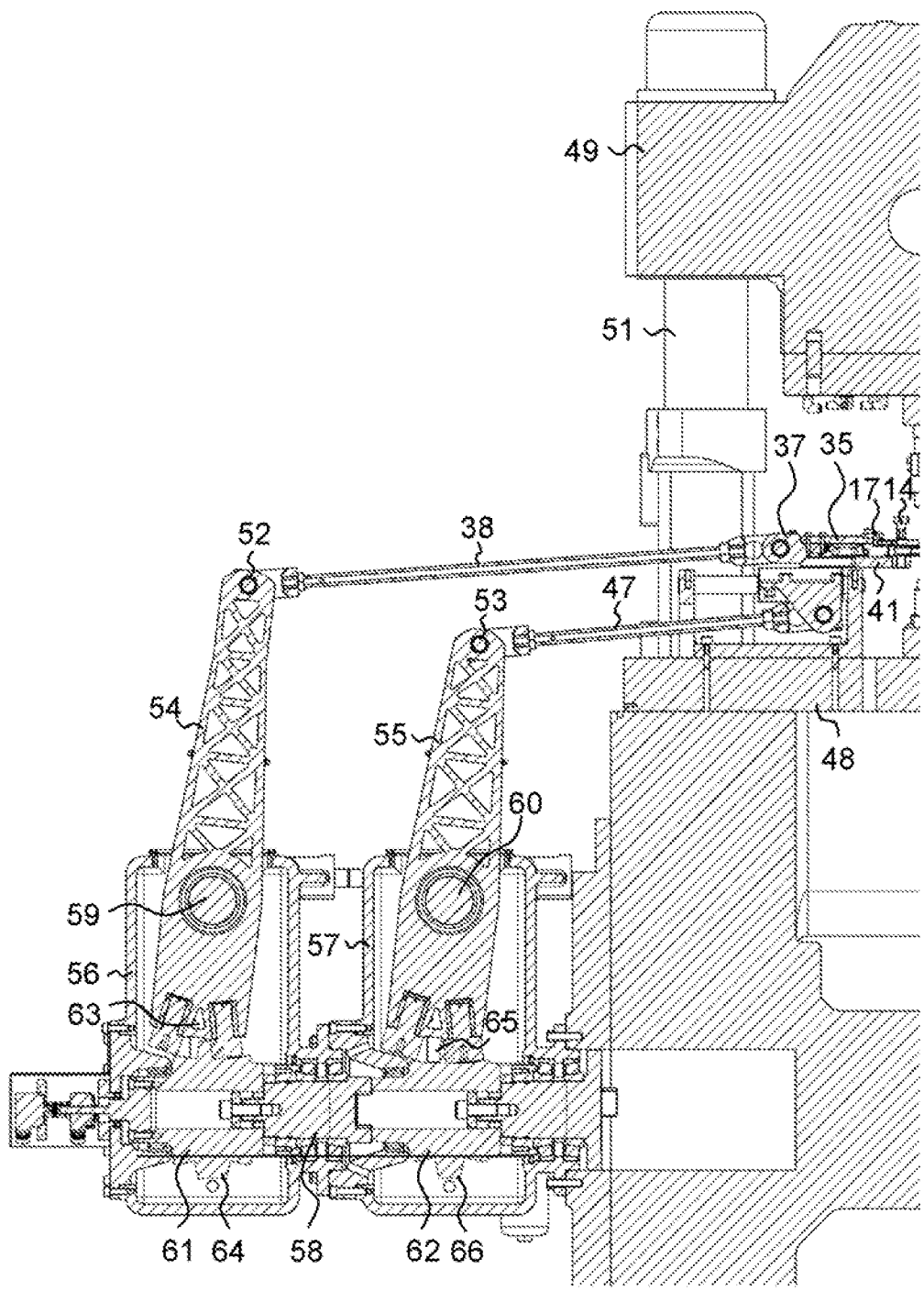
FIG. 11 shows the gearbox and the coupling of the transfer processing plant according to FIG. 10, in a sectional illustration.

As can be seen in particular from FIG. 11, in the case of these two cam mechanisms there are in each case individual cam portions 61 and 62, respectively, cam arms 63 and 65, respectively, and cam ribs 64 and 66, respectively. As a result of the design embodiment of the cam ribs 64 and 66, the movement characteristic described above is now coordinated, consequently controlled, by the gripper rods 2 and thrust rods 3 such that the thrust rod at the transfer and the dispensing position reaches a respective detent later than the gripper rod.

Figure 13A:
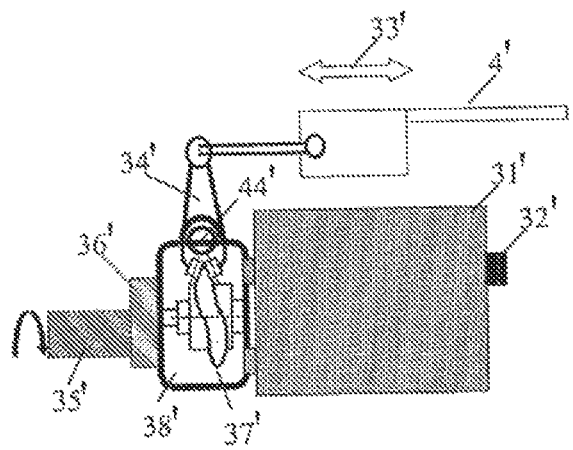
FIG. 13 in 13 a) shows a schematic illustration of the transfer system having a drive with a variable feed time, or with variable angles, respectively, and in 13 b) shows a section through the worm gear/cam mechanism and the feed lever of one embodiment.

Reproduced in FIG. 13 a) is a schematic illustration of the transfer system having a drive of this type, having a variable feed time, or having variable angles, respectively. A servomotor 35' having a variable rotating speed and an angular encoder drives a mechanical cam mechanism 38' in which the sectors are conceived according to optimal considerations for a maximum number of cycles of the press 31'. This optimization is typically conceived for a constant rotating speed of the motor. A reduction gear 36' can moreover be disposed between the servomotor 35' and the cam mechanism 38'. The servomotor 35' is an electric motor which can be switched, that is to say the output of said motor being able to be controlled. For example, a servomotor 35' having 3000 revolutions/min and a reduction gear 36' having a factor of 1:10 can be used such that there is an input speed of 300 revolutions/min at the transfer gear 38'. The servomotor 35' is synchronized by being controlled by an angular encoder 32', the latter being driven by the eccentric shaft of the press 31'. In order for the synchronization to be guaranteed, the servomotor 35' likewise possesses an angular encoder. The angular encoder is an electronic functional group which is capable of dividing a revolution of a shaft (for example the eccentric shaft of the press) of 360' into increments of, for example, 0.044 and of precisely calculating the respective angular position of the eccentric shaft. The transfer gear 38' comprises a gear worm 37' which from the rotating movement of the servomotor 35' generates a longitudinal movement. This longitudinal movement is transmitted to the transport rods 4' by way of a feed lever 34' having the axle 44'. Running at the maximum number of cycles according to the conception of the mathematical law of the cams of the transfer gear 38', the servomotor 35' runs at a constant rotating speed, the latter corresponding precisely to the rotating speed of the eccentric shaft of the press 31'. In this operating mode, the system runs exactly the same as if the gearbox 38' would be directly driven by the eccentric shaft of the press 31'. If the advantages of the servomotor 35' are now to be utilized, the rotating speed of the motor 35' can be varied in the individual cam sectors. A variable feed time can thus be permitted at a fixed feed path 33'.

Figure 13B:
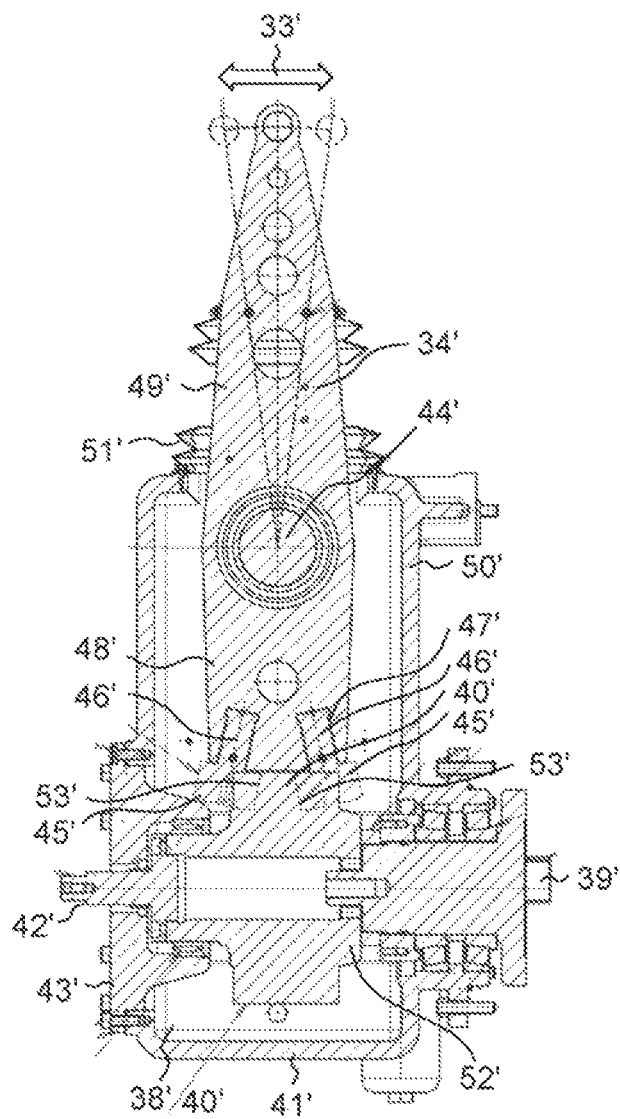

FIG. 13b) shows a section through a worm gear for a drive of a transfer apparatus. This here is not a classic worm gear which converts a rotation about a first axis into a rotation about the other axis, but this is rather a worm gear which converts a rotation about a first axis into a rocking movement of the feed lever. Accordingly, a thread is not provided on the rotating rotor 51' but rather a worm 40' which forms a continuously running, closed contour about the circulation of the rotor 51'. In a developed view, this contour describes substantially a waveform, wherein the characteristic of this waveform is predefined by the desired movement of the feed lever. The drive hub 39' of this gearbox is rotatingly driven by a motor. This drive hub 39' is mounted in a housing 41' which on the side opposite the drive hub 39' is closed by a housing cover 43'. The stop shaft 42' protrudes outward through this housing cover 43'. The rotor 52', driven by the hub 39', runs in the housing 41. The feed lever 31' in turn is pivotably mounted by way of a rotation axis 44' which is oriented so as to be perpendicular to the axis of the drive hub 39'. The lower part of this feed lever 34', that is to say the gearbox-proximal arm 48' of this lever, is disposed in an upper housing 50' of the gearbox. The gearbox-proximal arm 48', on the lower end thereof, possesses two cam rollers 45' which contact the worm 40' on the two axial flanks 53' which are lateral in terms of the axis of the drive hub 39', and roll on these flanks 53'. The cam rollers 45' by way of their axles 46' are recessed in corresponding bearing bushes 47' at the lower end of the gearbox-proximal arm 48'. The two axles 46' of the two cam rollers 45' here are not disposed in parallel but at an angle of at least 10°, such that said two axles 46' encompass the worm 40' so as to converge toward the arm 48'. The transfer-proximal arm 49' in turn protrudes beyond the housing 50' and is sealed by way of a flexible seal 51 such that the upper part of the housing 50' and thus also the entire worm gear are protected.

LIST OF REFERENCE SIGNS

| | |
|---|---|
| 1 | Feed apparatus |
| 2 | Gripper rod |
| 3 | Thrust rod |
| 4 | Gripper element |
| 5 | Gripper pin |
| 5.1 | Gripper pin in station 1 |
| 5.2 | Gripper pin in station 2 |
| 5.3 | Gripper pin in station 3 |
| 5.4 | Gripper pin in stations 4-7 |
| 6 | Gripper fork |
| 6.1 | Gripper fork in station 1 |
| 6.2 | Gripper fork in station 2 |
| 6.3 | Gripper fork in station 3 |
| 6.4 | Gripper fork in stations 4-7 |
| 7 | Gripper carrier for 5 |
| 8 | Transverse through openings in 2 |
| 9 | Transverse through openings for gripper elements |
| 10 | Cover |
| 11.1-11.7 | Component in stations 1-7 |
| 12 | Coupling element on 3 |
| 13 | Coupling element on 2 |
| 14 | Vertical set screw for 13 |
| 15 | Horizontal locking screw for 13 |
| 16 | Fork arm for 13 |
| 17 | Upwardly directed protrusion of 12 |
| 18 | Longitudinal groove in 2 for 3 |
| 19 | Downwardly open guide groove in 10 for 2 |
| 20 | Friction plate |
| 21 | Piston of 5 |
| 22 | Passage in 7 |
| 23 | Extension of 22 |
| 24 | Internal region of 22 |
| 25 | Spring element |
| 26 | Vertical gate opening in 7 |
| 27 | Detent position of gripper retracted from 26 |
| 28 | Detent position of gripper deployed from 26 |
| 29 | Displacement range of 26 |
| 30 | Vertical gate pin for 26 on 3 |
| 31 | Rearward extension of 6 |
| 32 | Fork region of 6 |
| 33 | Curved gripping region of 6 |
| 34 | Gripper tip of 5 |
| 35 | Coupling crossbar for thrust rods |
| 36 | Vertical recesses in 35 for 17 |
| 37 | Coupling joint for 35 |
| 38 | Coupling rod for thrust rod control |
| 39 | Fork element on 38 |
| 40 | Axle of 37 |
| 41 | Coupling crossbar for gripper rods |
| 42 | Vertical recesses in 41 for 13 |
| 43 | Carrier element for 41 |
| 44 | Guide cylinder of 43 |
| 45 | Coupling joint for 41 |
| 46 | Axle of 45 |
| 47 | Coupling rod for gripper rod control |
| 48 | Carrier plate of transfer unit |
| 49 | Upper tool plate |
| 50 | Lower tool plate |
| 51 | Guide column between 49 and 50 |
| 52 | Deflection of 38 on gearbox lever |
| 53 | Deflection of 47 on gearbox lever |
| 54 | Gearbox lever of thrust rod control |
| 55 | Gearbox lever of gripper rod control |
| 56 | Gearbox for thrust rods |

-continued

LIST OF REFERENCE SIGNS

| | |
|---|---|
| 57 | Gearbox for gripper rods |
| 58 | Common drive axle of 56 and 57 |
| 59 | Axle of 54 |
| 60 | Axle of 55 |
| 61 | Cam portion on 58 for 54 |
| 62 | Cam portion on 58 for 55 |
| 63 | Cam arm of 54 |
| 64 | Cam rib on 61 |
| 65 | Cam arm of 55 |
| 66 | Cam rib on 62 |
| 67 | Longitudinal direction |
| 68 | Transverse direction |
| 70 | Curved region of 26 |
| 4' | Transport rod, cf. ⅔ |
| 31' | Press |
| 32' | Angular encoder |
| 33' | Feed path |
| 34' | Feed lever, gearbox lever |
| 35' | Motor, servomotor |
| 36' | Reduction gear |
| 37' | Gear worm, cam rib |
| 38' | Transfer gear, cam mechanism |
| 39' | Drive hub |
| 40' | Worm |
| 41' | Housing |
| 42' | Stub shaft |
| 43' | Housing cover |
| 44' | Rotation axis of 34' |
| 45' | Cam roller |
| 46' | Axle of 45' |
| 47' | Bearing of 45' |
| 48' | Gearbox-proximal arm of 34' |
| 49' | Transfer-proximal arm of 34' |
| 50' | Upper housing |
| 51' | Seal |
| 52' | Rotor |
| 53' | Flank of 40' |
| G1 | Gripper rod position 1 |
| G2 | Gripper rod position 2 |
| G3 | Gripper rod position 3 |
| G4 | Gripper rod position 4 |
| G5 | Gripper rod position 5 |
| V | Offset between 2 and 3 |
| F | Spring travel |

The invention claimed is:

1. An apparatus for the clocked longitudinal transport of workpieces between at least two processing stations in a transfer press,
wherein the apparatus at least on one side as a control group has a first control element and a second control element which are displaceable exclusively in a longitudinal manner,
wherein the two control elements are mounted so as to be mutually displaceable exclusively in the longitudinal direction, and both control elements are driven by way of a common shaft;
wherein the first control element is a gripper rod for the longitudinal transport of the workpieces between the processing stations,
wherein at least two gripper elements which in the longitudinal direction are offset by the spacing between the processing stations and can be displaced exclusively in a transverse direction are mounted in the gripper rod; and
wherein the second control element is a thrust rod which positively controls a transverse movement of the at least two gripper elements;
and wherein the thrust rod at least in portions is mounted so as to slide in or on the gripper rod.

2. The apparatus as claimed in claim 1, wherein the thrust rod and the gripper rod are moved by way of two cam mechanisms which are driven by the common shaft.

3. The apparatus as claimed in claim 1,
wherein at least one of the gripper elements per se, or on a gripper pin, for at least partially circumferentially encompassing the workpiece, has a fork-shaped and/or curved gripping region that faces the tool,
wherein the gripping region is adapted to the radius of the workpiece in the corresponding transport section; or
wherein at least one of the gripper elements has a substantially planar gripper tip that faces the workpiece.

4. The apparatus as claimed in claim 1,
wherein at least one of the gripper elements has a gripper carrier which is mounted in the gripper rod so as to be exclusively transversely displaceable and in this gripper carrier, so as to be displaceable, has a gripper pin; or
wherein the workpieces between the processing stations are gripped on both sides by a respective gripper, in the gripped state are transported in the longitudinal direction to the next processing station, and in the next processing station are released again, and
wherein at least one of the grippers is configured so as to be sprung and to have an elastic restoring force in relation to the workpiece.

5. A method for transporting workpieces between different processing stations of a transfer press, wherein at least one apparatus as claimed in claim 1 is used for the transport between the stations.

6. A method for transporting workpieces according to claim 5, in the form of a method for producing workpieces in steps, proceeding from a flat initial material, from metal, including steel or aluminum, that is supplied in the form of a strip,
wherein the workpiece, if need be after a first stamping step and a subsequent first forming step, is gripped at least once from both sides by a gripper pair and transported to a downstream processing station.

7. A method for transporting workpieces according to claim 6,
wherein either both grippers are configured so as to be sprung, and the transverse movement of the transport means at least partially or exclusively consists in that the workpieces by the processing tool at this processing station, counter to the spring force of the grippers, is pushed into the latter for mounting, or
only one of the grippers is configured so as to be sprung, and the transverse movement of the transport means, or gripper elements, respectively, disposed on opposite sides of the workpiece is positively controlled so as not to be mirror-symmetrical in terms of the workpiece position.

8. A method for transporting workpieces according to claim 7, wherein controlling of the transverse movement takes place in an asymmetrical manner such that the impact velocity of the sprung gripper on the part is less than the impact velocity of the non-sprung gripper.

9. A transfer press having an apparatus as claimed in claim 1.

10. A transfer press as claimed in claim 9, in the form of a transfer press having a plurality of rows of processing stations that are offset in the transverse direction.

11. A method of using an apparatus as claimed in claim 1 in a transfer press.

12. The method according to claim 11 in a transfer press having a plurality of rows of processing stations that are offset in the transverse direction.

13. A workpiece produced while using an apparatus as claimed in claim 1.

14. A workpiece according to claim 13, in the form of a pot-shaped, stamped and formed workpiece, from metal.

15. The apparatus as claimed in claim 1, wherein the thrust rod at least in portions is mounted so as to slide in or on the gripper rod, in a longitudinal groove which at least in portions is open toward the top and/or in portions is closed by covers.

16. The apparatus as claimed in claim 1,
wherein the thrust rod and the gripper rod are moved by way of two cam mechanisms which are driven by the common shaft, and
wherein the two cam mechanisms substantially generate identical movement by way of displacement of phases.

17. The apparatus as claimed in claim 1,
wherein the apparatus on both sides of a longitudinal row of processing stations has first and second control elements of this type,
wherein either the transverse movement of the respective transversely opposite gripper elements are positively controlled in a mirror-symmetrical manner in terms of the workpiece position, or
wherein a sprung gripper is disposed only on one side of the workpiece, and an unsprung gripper is disposed on the opposite side, and the transverse movement of transport means, or gripper elements, respectively, disposed on opposite sides of the workpiece is positively controlled so as not to be mirror-symmetrical in terms of the workpiece position, and
wherein controlling of the transverse movement takes place in an asymmetrical manner such that the impact velocity of the sprung gripper on the part is less than the impact velocity of the non-sprung gripper.

18. The apparatus as claimed in claim 1,
wherein at least one of the gripper elements per se, or on a gripper pin, for at least partially circumferentially encompassing the workpiece, has a fork-shaped and/or curved gripping region that faces the tool,
wherein the gripping region is adapted to the radius of the workpiece in the corresponding transport section, or
wherein at least one of the gripper elements has a substantially planar gripper tip that faces the workpiece, and
wherein gripper elements which are opposite in terms of the workpiece and grip the same tool have a substantially planar gripper tip on the one side and a fork-shaped and/or curved gripping region on the other side.

19. The apparatus as claimed in claim 1,
wherein at least one of the gripper elements has a gripper carrier which is mounted in the gripper rod so as to be exclusively transversely displaceable and in this gripper carrier, so as to be displaceable, has a gripper pin which is elastically braced, including by way of a spring, including a helical spring, or by way of compressed air or an elastomer spring, in relation to the workpiece, wherein the restoring action can be designed so as to be adjustable, or
wherein the workpieces between the processing stations are gripped on both sides by a respective gripper, in the gripped state are transported in the longitudinal direction to the next processing station, and in the next processing station are released again, and wherein at least one of the grippers is configured so as to be sprung and to have an elastic restoring force in relation to the workpiece,
wherein the spring action of the at least one gripper is formed by an elastic spring element, and
wherein this spring element includes those formed by a leaf spring, compressed air, a helical spring, or an elastomer spring.

20. The apparatus as claimed in claim 1, wherein, as a function the corresponding processing stations, the regions of the gripper elements, or of the gripper pins mounted in a gripper carrier, respectively, that contact the respective workpiece in the vertical direction are disposed at dissimilar heights, in that the gripper elements, or the gripper pins, respectively, have two horizontal portions and a vertical portion connecting said two horizontal portions.

21. An apparatus for the clocked longitudinal transport of workpieces between at least two processing stations in a transfer press,
wherein the apparatus at least on one side as a control group has a first control element and a second control element which are displaceable exclusively in a longitudinal manner,
wherein the two control elements are mounted so as to be mutually displaceable exclusively in the longitudinal direction, and both control elements are driven by way of a common shaft;
wherein the first control element is a gripper rod for the longitudinal transport of the workpieces between the processing stations,
wherein at least two gripper elements which in the longitudinal direction are offset by the spacing between the processing stations and can be displaced exclusively in the transverse direction are mounted in the gripper rod;
wherein the second control element is a thrust rod which positively controls the transverse movement of the at least two gripper elements
wherein the gripper elements have at least one recess or through opening which in the form of a gate is open in a vertical direction, and
wherein the thrust rod has an extension or pin which, so as to positively control the transverse movement of the gripper elements, engages in this gate in each case at the position of the corresponding gripper element; or
wherein the thrust rod at the position of the corresponding gripper element has in each case at least one recess or through opening which in the form of a gate is open in the vertical direction, and wherein the gripper elements have an extension or pin which, so as to positively control the transverse movement of the gripper elements, engages in this gate.

22. The apparatus as claimed in claim 21,
wherein the gate in the gripper elements in each case has a first region for a retracted gripper element and a second region for a deployed gripper element and a displacement range connecting these two regions, and
wherein the first region in the gripper element in the transverse direction is disposed so as to be closer to the workpiece than the second region, and the displacement range is configured as a linear or curved connecting duct or connecting through opening.

23. The apparatus as claimed in claim 21,
wherein the gate in the gripper elements in each case has a first region for a retracted gripper element and a second region for a deployed gripper element and a displacement range connecting these two regions, and wherein the first region in the gripper element in the transverse direction is disposed so as to be closer to the workpiece than the second region, and the displacement range is configured as a S-shaped connecting duct or connecting through opening.

24. An apparatus for the clocked longitudinal transport of workpieces between at least two processing stations in a transfer press,
   wherein the apparatus at least on one side as a control group has a first control element and a second control element which are displaceable exclusively in a longitudinal manner,
   wherein the two control elements are mounted so as to be mutually displaceable exclusively in the longitudinal direction, and both control elements are driven by way of a common shaft;
   wherein the first control element is a gripper rod for the longitudinal transport of the workpieces between the processing stations,
   wherein at least two gripper elements which in the longitudinal direction are offset by the spacing between the processing stations and can be displaced exclusively in the transverse direction are mounted in the gripper rod; and
   wherein the second control element is a thrust rod which positively controls the transverse movement of the at least two gripper elements
   wherein the apparatus on both sides of a longitudinal row of processing stations has first and second control elements of this type; and
   wherein either the transverse movement of the respective transversely opposite gripper elements are positively controlled in a mirror-symmetrical manner in terms of the workpiece position; or
   wherein a sprung gripper is disposed only on one side of the workpiece, and an unsprung gripper is disposed on the opposite side, and the transverse movement of transport means, or
   gripper elements, respectively, disposed on opposite sides of the workpiece is positively controlled so as not to be mirror-symmetrical in terms of the workpiece position.

25. The apparatus as claimed in claim 24, wherein said apparatus is provided for the transport between at least two, or 2 to 5 or 2 to 4, longitudinal rows of processing stations of the same transfer press, and has a number of respective first control elements and second control elements that is greater by one than the number of rows of processing stations, and the first control elements which are disposed between rows of processing stations mount gripper elements that protrude in both transverse directions, and the second control elements positively control the gripper elements simultaneously in both transverse directions.

26. The apparatus as claimed in claim 25,
   wherein the first control elements disposed between rows of processing stations have transversely running through openings in which the gripper elements, or gripper carriers of gripper elements, are displaceably mounted, and
   wherein gripper elements in the longitudinal direction are in each case mounted in an alternating manner in the one transverse direction and the other transverse direction.

27. The apparatus as claimed in claim 24, wherein the first control elements of the control groups disposed in parallel, in terms of the movement thereof, are controlled by way of a common, transversely running, coupling crossbar for the gripper rods, and the second control elements are controlled by way of a common, transversely running, coupling crossbar for the thrust rods, and wherein the coupling crossbar for the gripper rods is linked to a cam mechanism for the gripper rods, and the coupling crossbar for the thrust rods is linked to a cam mechanism for the thrust rods.

28. The apparatus as claimed in claim 24, wherein said apparatus is provided for the transport between at least two, or 2 to 5 or 2 to 4, longitudinal rows of processing stations of the same transfer press, and has a number of respective first control elements and second control elements that is greater by one than the number of rows of processing stations, and the first control elements which are disposed between rows of processing stations mount gripper elements that protrude in both transverse directions, and the second control elements, simultaneously, positively control the gripper elements simultaneously in both transverse directions, wherein the gates in the gripper elements protruding in different transverse directions are configured so as to be mirror-symmetrical in terms of the longitudinal direction.

29. The apparatus as claimed in claim 24,
   wherein the first control elements of the control groups disposed in parallel, in terms of the movement thereof, are controlled by way of a common, transversely running, coupling crossbar for the gripper rods, and the second control elements are controlled by way of a common, transversely running, coupling crossbar for the thrust rods, and
   wherein the coupling crossbar for the gripper rods, by way of at least one coupling rod, is linked to a cam mechanism for the gripper rods, and the coupling crossbar for the thrust rods, by way of at least one coupling rod, is linked to a cam mechanism for the thrust rods.

30. The apparatus as claimed in claim 24,
   wherein the movement of the transport means in the longitudinal direction takes place by way of at least one external drive which is synchronized with the movement of the press, and wherein the motorized external drive takes place by way of a cam mechanism having at least one feed lever which is driven by said cam mechanism and moves the transport means back and forth in the longitudinal direction without reversing the rotation of the external drive,
   wherein the at last one feed lever on the gearbox-proximal arm thereof, for coupling to the worm on the rotor of the cam mechanism possesses at least two cam rollers, and
   wherein the cam rollers roll on the opposite flanks of the worm that are axial in terms of the axis of the rotor.

31. An apparatus for the clocked longitudinal transport of workpieces between at least two processing stations in a transfer press,
   wherein the apparatus at least on one side as a control group has a first control element and a second control element which are displaceable exclusively in a longitudinal manner,
   wherein the two control elements are mounted so as to be mutually displaceable exclusively in the longitudinal direction, and both control elements are driven by way of a common shaft;
   wherein the first control element is a gripper rod for the longitudinal transport of the workpieces between the processing stations,
   wherein at least two gripper elements which in the longitudinal direction are offset by the spacing between the processing stations and can be displaced exclusively in the transverse direction are mounted in the gripper rod; and wherein the second control element is a thrust rod which positively controls the transverse movement of the at least two gripper elements
wherein, as a function the corresponding processing stations, the regions of the gripper elements, or of gripper pins mounted in a gripper carrier, respectively, that contact the respective workpiece in the vertical direction are disposed at dissimilar heights.

\* \* \* \* \*